US012794736B2

(12) United States Patent
Oosawa et al.

(10) Patent No.: US 12,794,736 B2
(45) Date of Patent: Nov. 10, 2026

(54) CONTROL DEVICE, CONTROL METHOD, AND COMPUTER-READABLE STORAGE MEDIUM FOR PERFORMING HIGHLY ACCURATE CHANNEL ESTIMATION IN WIRELESS COMMUNICATION

(71) Applicant: KDDI Research, Inc., Fujimino (JP)

(72) Inventors: Noboru Oosawa, Fujimino (JP); Kosuke Yamazaki, Fujimino (JP); Takeo Ohseki, Fujimino (JP); Caire Giuseppe, Berlin (DE); Göttesch Fabian, Berlin (DE)

(73) Assignee: KDDI Research, Inc., Fujimino (JP)

( * ) Notice: Subject to any disclaimer, the term of this patent is extended or adjusted under 35 U.S.C. 154(b) by 265 days.

(21) Appl. No.: 18/806,200

(22) Filed: Aug. 15, 2024

(65) Prior Publication Data

US 2024/0414028 A1 Dec. 12, 2024

Related U.S. Application Data

(63) Continuation of application No. PCT/JP2023/005164, filed on Feb. 15, 2023.

(30) Foreign Application Priority Data

Feb. 18, 2022 (JP) ................................ 2022-024006

(51) Int. Cl.
*H04L 25/02* (2006.01)

(52) U.S. Cl.
CPC ................................ *H04L 25/0224* (2013.01)

(58) Field of Classification Search
CPC . H04L 27/261; H04L 25/022; H04L 25/0204; H04L 25/0224
See application file for complete search history.

(56) References Cited

U.S. PATENT DOCUMENTS

| | | | | |
|---|---|---|---|---|
| 6,091,788 | A * | 7/2000 | Keskitalo | H04B 7/10 455/562.1 |
| 10,014,998 | B2 * | 7/2018 | Nakajima | H04J 11/00 |

(Continued)

OTHER PUBLICATIONS

Haifan Yin et al., "Pilot decontamination using combined angular and amplitude based projections in massive MIMO systems," 2015 IEEE 16th International Workshop on Signal Processing Advances in Wireless Communications (SPAWC) 2015, pp. 216 to 220.

Kengo Ando et al., "Tensor-aided Beamforming Design for Cell-Free MIMO," IEICE Technical Report vol. 120, No. 404 [online], Feb. 24, 2021, chapters 1-3.

(Continued)

*Primary Examiner* — Abdullahi E Salad
(74) *Attorney, Agent, or Firm* — Foley & Lardner LLP

(57) ABSTRACT

A device obtains a first sequence by arranging, in a predetermined order, a plurality of first channel estimation values obtained by receiving a signal including a first signal transmitted from a terminal device at each of a plurality of antennas, converts the first sequence of a first domain to a second sequence of a second domain by performing Fourier transform on the first sequence, identifies a range in which a signal transmitted from the terminal device is received in the second domain, based on the second sequence, obtains third channel estimation values by extracting components within the range in the second domain from second channel estimation values obtained by receiving a second signal transmitted from the terminal device at each of the plurality of antennas, and controls such that communication with the terminal device is performed using the third channel estimation values.

6 Claims, 3 Drawing Sheets

(56) References Cited

U.S. PATENT DOCUMENTS

| | | | | |
|---|---|---|---|---|
| 2008/0031375 | A1* | 2/2008 | Zhou | H04L 25/022 375/267 |
| 2008/0267320 | A1* | 10/2008 | Dateki | H04L 25/0218 455/334 |
| 2011/0007792 | A1* | 1/2011 | Kimata | H04L 25/03828 375/232 |
| 2011/0075743 | A1* | 3/2011 | Koike | H04L 25/0204 375/259 |
| 2013/0156138 | A1 | 6/2013 | Nie et al. | |
| 2015/0256420 | A1 | 9/2015 | Al-Banna | |
| 2017/0079051 | A1* | 3/2017 | Sihlbom | H04B 7/0854 |

OTHER PUBLICATIONS

Masaaki Ito et al., "Performance Evaluation of Scalable Cell-Free Massive MIMO Systems with Multiple CPUs Subject to Backhaul Capacity Limitation," IEICE Technical Report vol. 121, No. 210 [online], Oct. 14, 2021, chapters 1-4.

Naoki Aihara et al., "Performance Analysis on distributed CPU Cooperation Schemes of CF-mMIMO on User-Centric RAN Towards Beyond 5G," IEICE Technical Report vol. 121, No. 302 [online], Dec. 9, 2021, chapters 1-3.

Takahiro Matsuda et al., "Study on Channel Database for Cell-Free Massive MIMO," IEICE Technical Report vol. 121 No. 357 [online], Jan. 20, 2022, chapters 1-4.

Al-Salihi et al., "DFT-based Channel Estimation Techniques for Massive MIMO Systems," IEEE, 2018 (pp. 383-387).

EP Supplementary Search Report for EP Appl. Ser. No. 23756391.1 dated May 7, 2025 (pp. 1-8).

* cited by examiner

CONTROL DEVICE, CONTROL METHOD, AND COMPUTER-READABLE STORAGE MEDIUM FOR PERFORMING HIGHLY ACCURATE CHANNEL ESTIMATION IN WIRELESS COMMUNICATION

CROSS-REFERENCE TO RELATED APPLICATION(S)

This application is a continuation of International Patent Application No. PCT/JP2023/005164 filed on Feb. 15, 2023, which claims priority to and the benefit of Japanese Patent Application No. 2022-024006 filed on Feb. 18, 2022, the entire disclosures of which are incorporated herein by reference.

BACKGROUND OF THE INVENTION

Field of the Invention

The present invention relates to a channel estimation technique in wireless communications.

Description of the Related Art

A cell-free massive MIMO system in which a large number of antennas are densely arranged and some of the large number of antennas are used to communicate with a terminal device has been studied. In this cell-free massive MIMO system, a cell is virtually configured for each terminal device by selecting antennas to be used for each terminal device, and the terminal device is located approximately at the center of the virtual cell. With this technique, the terminal device can obtain uniform communication quality regardless of the position of the terminal device.

For efficient communication in such a cell-free massive MIMO system, it is important to perform highly accurate channel estimation between a large number of antennas that are geographically distributed in the network and an antenna of a terminal device. In the system, the network associates the terminal device with an antenna existing in the vicinity of the terminal device, and channel estimation is performed on a transmission path between the antenna and the terminal device. For example, when uplink communication from a terminal device is performed, a reference signal transmitted from the terminal device is received by an antenna associated with the terminal device, and channel estimation is performed based on the received reference signal.

Patterns of signals available as reference signals are finite. Therefore, it is conceivable that a plurality of terminal devices transmit reference signals using the same pattern. In this case, the reference signals transmitted from the plurality of terminal devices are received in a mixed manner by an antenna on the network side, and the accuracy of channel estimation may be degraded due to the influence of interference caused by the reference signals transmitted from the other terminal devices.

SUMMARY OF THE INVENTION

The present invention provides a technique for improving the accuracy of channel estimation in a wireless communication system in which a communication service is provided to a terminal device by selectively using a large number of antennas.

A control device according to one aspect of the present invention is a control device comprising: one or more processors; and one or more memories that store a computer-readable instruction for causing, when executed by the one or more processors, the control device to: obtain a first sequence by arranging a plurality of first channel estimation values in a predetermined order, the first channel estimation values being obtained by receiving a signal including a first signal transmitted from a terminal device at each of a plurality of antennas; convert the first sequence of a first domain to a second sequence of a second domain by performing Fourier transform on the first sequence; identifies a range in which a signal transmitted from the terminal device is received in the second domain, based on the second sequence; obtains third channel estimation values by extracting components within the range in the second domain from second channel estimation values obtained by receiving a second signal transmitted from the terminal device at each of the plurality of antennas; and performs control such that communication with the terminal device is performed with use of the third channel estimation values.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
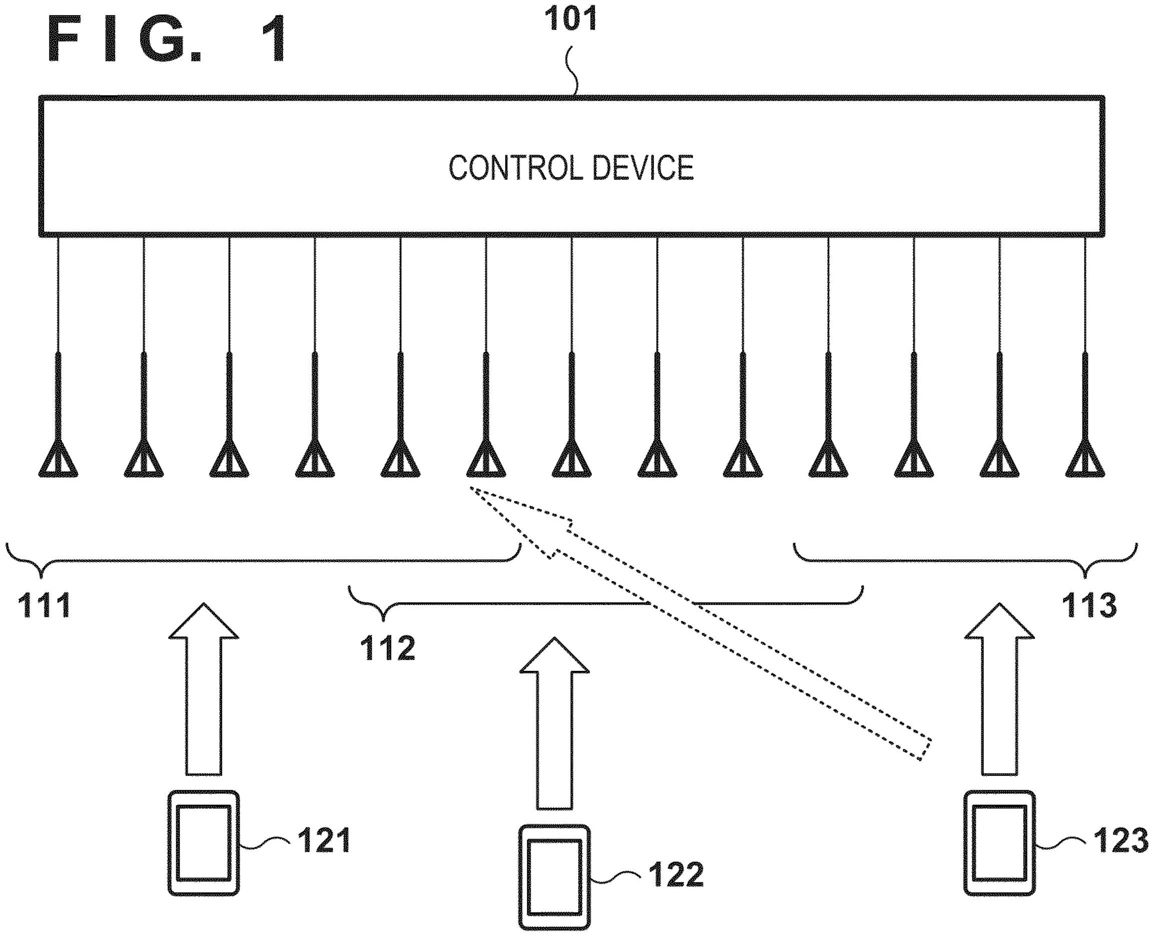
FIG. 1 is a diagram schematically showing an example of a configuration of a wireless communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

A wireless communication system according to the present embodiment will be described. The wireless communication system includes a large number of antennas that are geographically distributed, and some of the large number of antennas are associated with a terminal device based on the position of the terminal device, for example, and are used for communication with the terminal device. In an example, the wireless communication system is a cell-free massive MIMO system in which a cell is virtually configured for each terminal device by selecting antennas to be used for each terminal device. In this system, the terminal device can be located approximately at the center of the virtual cell by appropriately setting the antennas associated with the terminal device, and therefore, good communication quality can be obtained regardless of the position of the terminal device.

FIG. 1 schematically shows the cell-free massive MIMO system. A control device 101 controls a large number of antennas that are geographically distributed, and associates a plurality of antennas with each of terminal devices 121 to 123. Then, the control device performs control such that communication with the terminal devices 121 to 123 is performed with use of the plurality of antennas associated with each of the terminal devices. FIG. 1 shows a case as an example in which an antenna group 111 is associated with the terminal device 121, an antenna group 112 is associated with the terminal device 122, and an antenna group 113 is associated with the terminal device 123. Note that the antennas shown in FIG. 1 may be antennas configured to transfer a radio frequency (RF) signal to the control device 101 as it is, or may be communication devices configured to perform processing such as frequency conversion and amplification, for example, and transfer an intermediate frequency (IF) or baseband signal to the control device 101.

In order to improve the efficiency of communication with each terminal device, the control device 101 performs channel estimation between the terminal device and each of the plurality of antennas associated with the terminal device, and forms a beam using a channel estimation value to perform communication. For example, a terminal device generates and transmits a demodulation reference signal (DMRS) by using a reference symbol sequence allocated to the terminal device among a plurality of reference symbol sequences determined in advance. Then, the DMRS transmitted from the terminal device is received by each antenna, and the control device 101 obtains a channel estimation value by identifying a phase rotation amount, an amplitude attenuation amount, and the like by using the reference symbol sequence allocated to the terminal device. For efficient communication, it is important to perform the channel estimation with high accuracy. For this reason, when there is a plurality of terminal devices with which at least a portion of the antenna groups is commonly associated, for example, DMRSs transmitted from those terminal devices can be transmitted based on different reference symbol sequences. For example, the terminal device 121 and the terminal device 122 are set to transmit DMRSs based on different reference symbol sequences.

On the other hand, it is assumed that the number of terminal devices is very large. Therefore, there may be a case where a second terminal device that transmits a DMRS with use of the same reference symbol sequence as that used by a first terminal device is present in the vicinity of the first terminal device. In this case, a DMRS transmitted from the first terminal device and a DMRS transmitted from the second terminal device may interfere with each other, and the channel estimation accuracy may be deteriorated. For example, when the terminal device 121 and the terminal device 123 shown in FIG. 1 transmit DMRSs with use of the same reference symbol sequence, the channel estimation accuracy in the terminal device 121 may be deteriorated.

In this regard, H. Yin, L. Cottatellucci, D. Gesbert, R. R. Muller and G. He, "Pilot Decontamination Using Combined Angular and Amplitude based Projections in Massive MIMO Systems," 2015 IEEE 16th International Workshop on Signal Processing Advances in Wireless Communications (SPAWC) 2015, pp. 216 to 220 proposes a technique for obtaining a channel estimation value from which the influence of interference is eliminated in an environment in which signals transmitted from a plurality of terminal devices are mixed, by using Fourier transform (discrete Fourier transform, DFT) on a channel estimation value based on a signal received by each antenna. More specifically, tentative channel estimation values are obtained based on a signal transmitted from a terminal device and received by each of a plurality of antennas and a reference symbol sequence allocated to the terminal device. Then, the plurality of tentative channel estimation values corresponding to the respective antennas are arranged in a predetermined order and input to a Fourier transformer. For example, if the tentative channel estimation value of the n-th ($0 \leq n \leq N-1$) antenna among the antennas associated with the terminal device, for which the channel estimation is performed, is $h_n$, $H=[h_0, h_1, \ldots, h_{N-1}]^T$ is input to the Fourier transformer. Through the Fourier transform, a sequence of channel estimation values of a first domain, which includes the tentative channel estimation values of the plurality of antennas as elements, is converted to a sequence of channel estimation values of a second domain that is different from the first domain. Note that the second domain may be referred to as an "angular domain".

When a plurality of terminal devices use the same reference signal, the influence of interference remains in both the sequence of channel estimation values of the first domain and the sequence of channel estimation values of the second domain. In the sequence of channel estimation values of the first domain, the influences of signals transmitted from the plurality of terminal devices are added in elements corresponding to the respective antennas. On the other hand, in the sequence of channel estimation values of the second domain, components corresponding to the respective terminal devices may be unevenly distributed due to a difference between positions of the terminal devices. Therefore, it is possible to extract components corresponding to channel estimation values of the terminal device, for which the channel estimation is performed, and eliminate the influence of interference by using only values within a range corresponding to the channel estimation values of the terminal device in the sequence of channel estimation values of the second domain. However, H. Yin, L. Cottatellucci, D. Gesbert, R. R. Muller and G. He, "Pilot Decontamination Using Combined Angular and Amplitude based Projections in Massive MIMO Systems," 2015 IEEE 16th International Workshop on Signal Processing Advances in Wireless Communications (SPAWC) 2015, pp. 216 to 220 does not disclose a technique for identifying the range in which the components corresponding to the channel estimation values of the target terminal device are present in the sequence of channel estimation values of the second domain. If this range cannot be identified, the influence of interference cannot be eliminated appropriately.

The present embodiment provides a procedure that makes it possible to identify a range including channel estimation values of a terminal device, for which channel estimation is performed, in a sequence of channel estimation values of the second domain, and to use the above-described technique in an actual environment.

In the present embodiment, first, a first signal transmitted from a terminal device is received by a plurality of antennas, and the control device 101 obtains a plurality of first channel estimation values for the respective antennas based on the first signal. The first signal is a signal transmitted with use of a known sequence, and may be a sounding reference signal (SRS) generated with use of a sequence of reference symbols (pilot symbols) determined in advance, for example. Since the SRS is an existing signal, the processing according to the present embodiment can be executed without using an additional signal by using the SRS. Note that this is just one example, and an additional reference signal (generated with use of a reference symbol sequence for which the network and the terminal device have common knowledge) may be defined. When an additional reference signal is used, it is possible to design the signal with a higher degree of freedom to increase the efficiency of the processing, when compared with cases where an existing reference signal is used. The control device 101 obtains a first channel estimation value regarding an antenna by multiplying a baseband signal received by the antenna and subjected to frequency conversion or the like by the complex conjugate value of the pilot symbol in frequency and time resources in which the pilot symbol is transmitted, for example. Then, first channel estimation values obtained regarding the plurality of antennas associated with the terminal device, for which the channel estimation is performed, are arranged in a predetermined order to obtain a sequence of channel estimation values of a first domain. In the following description, this sequence of channel estimation values of the first domain may be referred to as a "first sequence". For example, if the first channel estimation value of the n-th ($0 \le n \le N-1$) antenna among the antennas associated with the target terminal device of the channel estimation is $h_n$ as described above, $H=[h_0, h_1, \ldots, h_{N-1}]^T$ is obtained as the first sequence.

The control device 101 performs Fourier transform on the obtained first sequence to convert the sequence of first channel estimation values of the first domain to a sequence of second channel estimation values of a second domain. In the following description, the sequence of second channel estimation values may be referred to as a "second sequence". In an example, the control device 101 obtains a plurality of second sequences by obtaining a plurality of first sequences and performing Fourier transform processing on each of the first sequences. The control device 101 extracts components corresponding to target channel estimation values, which are included in the second sequences, by performing statistical processing such as independent component analysis or principal component analysis on the plurality of second sequences, for example, and identifies a range in which those components are present in the second domain. Note that the statistical processing such as the principal component analysis or the independent component analysis may be performed not on the second sequences but on the first sequences prior to the Fourier transform. When the principal component analysis is performed on the first sequences, the Fourier transform is performed on signal components extracted as principal components. The control device 101 can then identify the range in which target channel estimation values are present in the second domain based on the components subjected to the Fourier transform.

Thereafter, a second signal that is different from the first signal and transmitted from the terminal device corresponding to the target channel estimation values is received via the plurality of antennas. The second signal is also a signal transmitted with use of a known sequence, and may be a DMRS, for example. The control device 101 identifies second channel estimation values for the second signal received by the plurality of antennas, by using the known sequence used to transmit the second signal. Then, the control device 101 obtains third channel estimation values by extracting components within the range identified as described above in the second domain from the second channel estimation values. First, the control device 101 obtains a sequence in which the second channel estimation values are arranged in the same order as the predetermined order in which the first channel estimation values are arranged. For example, if the second channel estimation value of the n-th ($0 \le n \le N-1$) antenna among the antennas associated with the target terminal device of the channel estimation is $h_{2,n}$, $H_2=[h_{2,0}, h_{2,1}, \ldots, h_{2,N-1}]^T$ is obtained as the sequence. In an example, the control device 101 can then calculate a sequence indicating third channel estimation values of the respective antennas by multiplying $H_2$ by a matrix $F \cdot F^H$ that is a product of a matrix F obtained by extracting only elements corresponding to the range in which the target channel estimation values are present from a matrix indicating the Fourier transform and an inverse transformation matrix $F^H$. Note that F is obtained by excluding elements in a row corresponding to the range in which the target channel estimation values are present from the matrix indicating the Fourier transform, and the superscript H indicates conjugate transposition. By calculating $F^H \cdot H_2$, only the elements corresponding to the range are output. Then, the sequence of third channel estimation values is calculated by calculating $F \cdot F^H \cdot H_2$ by multiplying a vector of the elements by the inverse transformation. On the other hand, if there is almost no component other than the target channel estimation values in the range where the target channel estimation values are present, it is possible to significantly suppress the influence of such a component by multiplying the component by the transformation matrix $F^H$. Accordingly, the third channel estimation values obtained by calculating $F \cdot F^H \cdot H_2$ are values from which components corresponding to channel estimation values other than the target channel estimation values are eliminated. Note that the processing of applying the operator $F \cdot F^H$ is merely an example, and the control device 101 can obtain a similar effect by performing Fourier transform on the sequence $H_2$ and replacing values outside the range in which the target channel estimation values are present in the second domain in the sequence subjected to the Fourier transform, with zero to perform inverse transformation, for example.

Then, the control device 101 performs control such that communication with the terminal device associated with those antennas is performed with use of the sequence of third channel estimation values of the respective antennas. In this way, the control device 101 can perform channel estimation between the terminal device and each of the plurality of antennas associated with the terminal device with high accuracy and provide a highly efficient communication service to the terminal device.

Note that, in order to efficiently separate channel estimation values corresponding to signals transmitted from a plurality of terminal devices, first signals transmitted from the terminal devices may be configured to have different properties. For example, when the second sequence described above is obtained a plurality of times and principal component analysis is performed based on the plurality of second sequences, if interference from signals transmitted from the same terminal device occurs in all of the plurality of second sequences, even interfering components may be extracted as principal components. Therefore, by creating a state in which the interference does not occur in at least any of the plurality of second sequences, it is possible to efficiently separate the channel estimation values. For example, the plurality of terminal devices may be configured to respectively transmit different reference signals in a plurality of time periods in which the plurality of second sequences are obtained. When the reference signals differ from each other in one or more time periods, it is possible to reduce at least the probability that interfering components will be extracted as principal components.

In order to prevent the occurrence of interference in at least any of the second sequences, the reference symbol sequence used to transmit the first signal may be changed for each time period, for example. For example, a plurality of pilot patterns may be prepared by varying a pilot symbol used to transmit a SRS on each opportunity of transmitting a SRS, and each terminal device may be configured to transmit the first signal by using any of the plurality of pilot patterns. The control device 101 may give each terminal device that is controlled by the control device an instruction specifying a pilot pattern to be used by the terminal device. In this case, even if two terminal devices transmit a common reference signal in a certain time period, it is possible to increase the probability that the terminal devices will transmit different reference signals in any other time period. Note that the plurality of pilot patterns referred to here allow the same pilot symbol to be used by a plurality of terminal devices in some time periods. On the other hand, the plurality of pilot patterns can be configured to significantly reduce the probability that a common pilot symbol will be used by the plurality of terminal devices in all time periods. In the above example, the patterns including different symbols are described, but there is no limitation to this configuration. That is to say, it is sufficient that any of the resources used to transmit reference signals such as time and frequency resources are set to be different. By making the resources used to transmit reference signals different in at least one opportunity of transmitting the reference signals from a plurality of terminal devices existing within a predetermined distance range as described above, it is possible to improve the accuracy of statistical signal processing and obtain channel estimation values from which the influence of interfering signals is eliminated.

(Apparatus Configuration)

Figure 2:
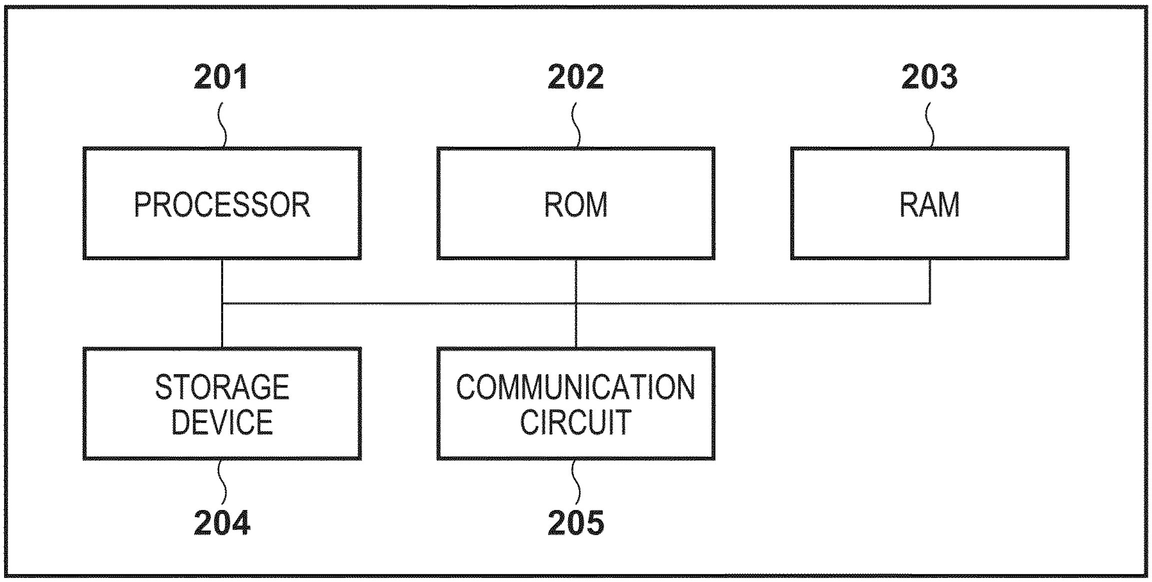
FIG. 2 is a diagram showing an example of a hardware configuration of a control device.

The following describes an example of a hardware configuration of the control device 101 with reference to FIG. 2. In an example, the control device 101 includes a processor 201, a ROM 202, a RAM 203, a storage device 204, and a communication circuit 205. The processor 201 is a computer including one or more processing circuits such as a general-purpose CPU (Central Processing Unit) and an ASIC (Application Specific Integrated Circuit), and executes overall processing of the control device and the above-described processing by reading and executing a program stored in the ROM 202 or the storage device 204. The ROM 202 is a read-only memory for storing a program and information such as various parameters related to processing executed by the control device 101. The RAM 203 is a random access memory that functions as a workspace when the processor 201 executes the program and information is temporarily stored in the RAM 203. The storage device 204 is constituted by a removable external storage device, for example. The communication circuit 205 is constituted by a circuit for receiving a signal received by each antenna from the antenna and transmitting a signal to be transmitted via an antenna or a signal for controlling the antenna to the antenna, for example. Although FIG. 2 shows one communication circuit 205, the control device 101 may include a plurality of communication circuits. For example, the control device 101 may include a communication circuit 205 for communication between the control device and antennas that are controlled by the control device, and a communication circuit 205 for communication between the control device and another control device that controls antennas other than those antennas.

Note that the control device 101 is configured to control communication of terminal devices by the processor 201 executing the program stored in the ROM 202 or the storage device 204, for example. In an example, the control device 101 controls the communication circuit 205 through operations of the processor 201 or the like to give a terminal device an instruction specifying a pilot pattern to be used by the terminal device, which is determined as described above. Also, the control device 101 executes control to perform communication with the terminal device by using channel estimation values estimated as described above. For example, the control device 101 can control a plurality of antennas associated with the terminal device such that communication is performed with use of appropriate beams.

Figure 3:
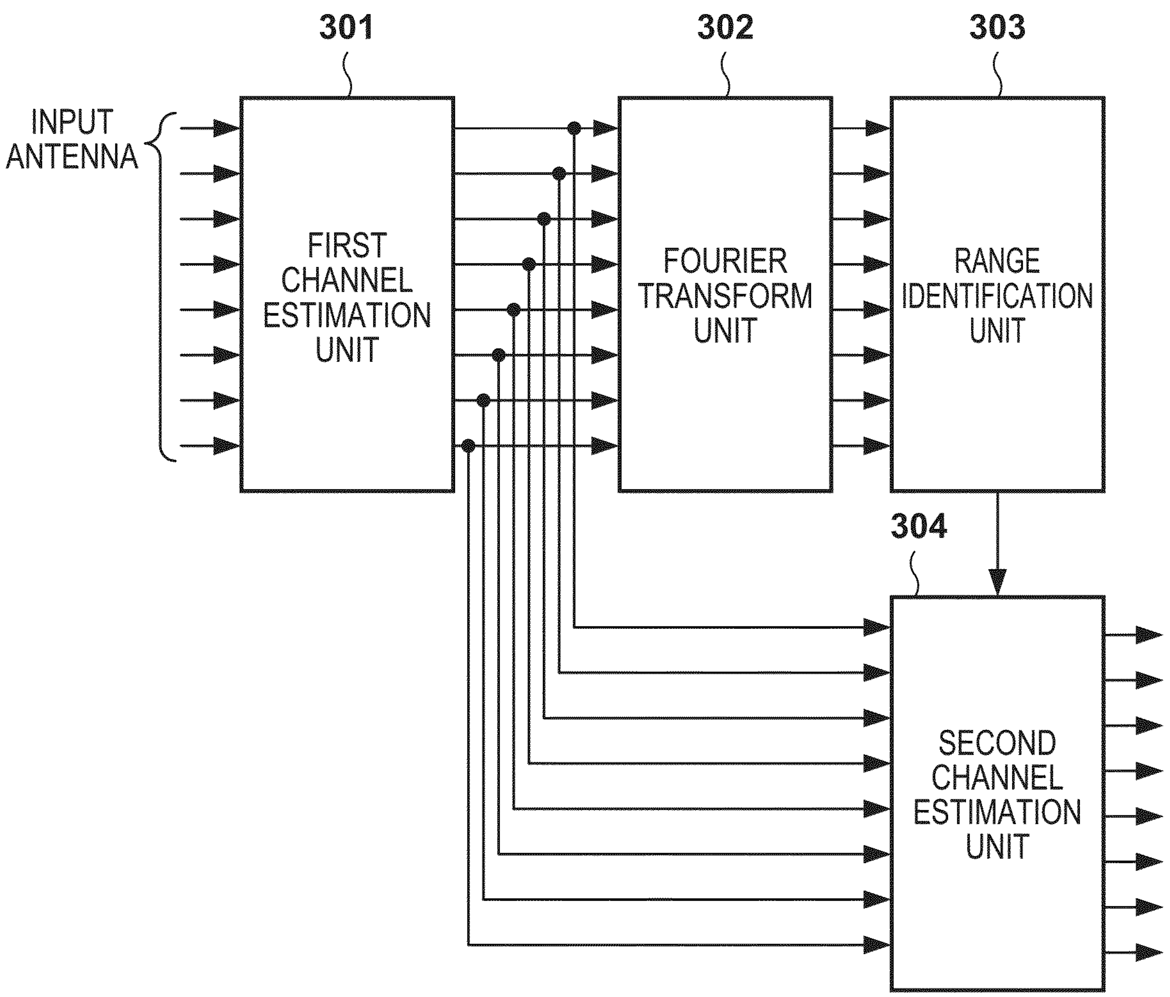
FIG. 3 is a diagram showing an example of a functional configuration of the control device.

FIG. 3 shows an example of a functional configuration of the control device 101 relating to channel estimation. The control device 101 may include a first channel estimation unit 301, a Fourier transform unit 302, a range identification unit 303, and a second channel estimation unit 304. These functions may be realized by the processor 201 executing the program stored in the ROM 202 or the storage device 204, for example, but a part or all of the functions may be realized by dedicated hardware. Note that the configuration shown in FIG. 3 is an example, and a configuration different from the configuration shown in FIG. 3 may be used as long as the functions of the control device 101 described above can be achieved.

When a reference signal transmitted from a terminal device to which a communication service is provided is input via a plurality of antennas associated with the terminal device, the first channel estimation unit 301 executes tentative channel estimation based on a reference symbol sequence used to transmit the reference signal. Here, the tentative channel estimation is executed by multiplying the signal received at each antenna by the complex conjugate value of the reference symbol sequence. If the amplitude of the reference symbol sequence is not 1, the multiplication result is divided by the square value of the amplitude of the reference symbol sequence. Channel estimation values obtained as described above are tentative channel estimation values that may include the influence of reference signals transmitted from other terminal devices with use of the same reference symbol sequence. Note that the obtained tentative channel estimation values respectively corresponding to the plurality of antennas are values of the first domain prior to Fourier transform. The first channel estimation unit 301 outputs, to the Fourier transform unit 302, the tentative channel estimation values regarding the signal for identifying a range in which channel estimation value components corresponding to the terminal device to which the communication service is provided are present in the second domain after the tentative channel estimation values of the respective antennas are subjected to the Fourier transform. For example, the first channel estimation unit 301 outputs channel estimation results obtained with use of a SRS to the Fourier transform unit 302. On the other hand, when the range in which channel estimation value components corresponding to the terminal device to which the communication service is provided are present in the second domain has already been identified, the first channel estimation unit 301 outputs the tentative channel estimation values regarding a signal for communication with the terminal device to the second channel estimation unit 304. For example, the first channel estimation unit 301 outputs channel estimation results obtained with use of a DMRS to the second channel estimation unit 304.

The Fourier transform unit 302 performs Fourier transform on a sequence of the tentative channel estimation values respectively corresponding to the plurality of antennas, which have been input from the first channel estimation unit 301. Through the Fourier transform, the tentative channel estimation values are converted from the sequence of the first domain to a sequence of the second domain. Note that the first channel estimation unit 301 may output a plurality of sequences each composed of tentative channel estimation values and respectively corresponding to a plurality of SRSs to the Fourier transform unit 302, and the Fourier transform unit 302 may perform Fourier transform on each of the plurality of sequences to generate a plurality of sequences of the second domain. The Fourier transform unit 302 outputs the sequence subjected to the Fourier transform to the range identification unit 303.

The range identification unit 303 analyzes the sequence of the second domain input from the Fourier transform unit 302, and identifies a range in which channel estimation values corresponding to the signal received from the terminal device to which the communication service is provided are present in the second domain. For example, the range identification unit 303 separates and extracts the channel estimation values corresponding to the signal received from the terminal device to which the communication service is provided by performing statistical processing such as principal component analysis or independent component analysis, and identifies a range in which those components are distributed in the second domain. Note that the range identification unit 303 may identify a range in which the separated and extracted channel estimation values are detected with at least a predetermined power, as the range in which the channel estimation values corresponding to the signal received from the terminal device to which the communication service is provided are present, for example. The range identification unit 303 outputs the identified range in the second domain to the second channel estimation unit 304.

The second channel estimation unit 304 determines a submatrix composed of portions of the Fourier transform and the inverse Fourier transform corresponding to only components within the range that is input from the range identification unit 303 and identified as the range in which channel estimation values corresponding to the signal received from the terminal device to which the communication service is provided are present. That is to say, the second channel estimation unit 304 identifies the operator $F \cdot F^H$ described above, for example. Then, the second channel estimation unit 304 multiplies the operator by the sequence (vector) of tentative channel estimation values respectively corresponding to the plurality of antennas, which have been input from the first channel estimation unit 301, to obtain final channel estimation values. Note that the operation performed here is similar to an operation of performing inverse Fourier transform after replacing components outside the range identified by the range identification unit 303 with 0 in the sequence of the second domain obtained by performing Fourier transform on the sequence of the tentative channel estimation values. Accordingly, the processing performed here may be replaced with a combination of the Fourier transform, replacement of the components, and the inverse Fourier transform. The second channel estimation unit 304 outputs the final channel estimation values, and the control device 101 performs control such that communication with the terminal device to which the communication service is provided is performed with use of the final channel estimation values.

(Flow of Processing)

Figure 4:
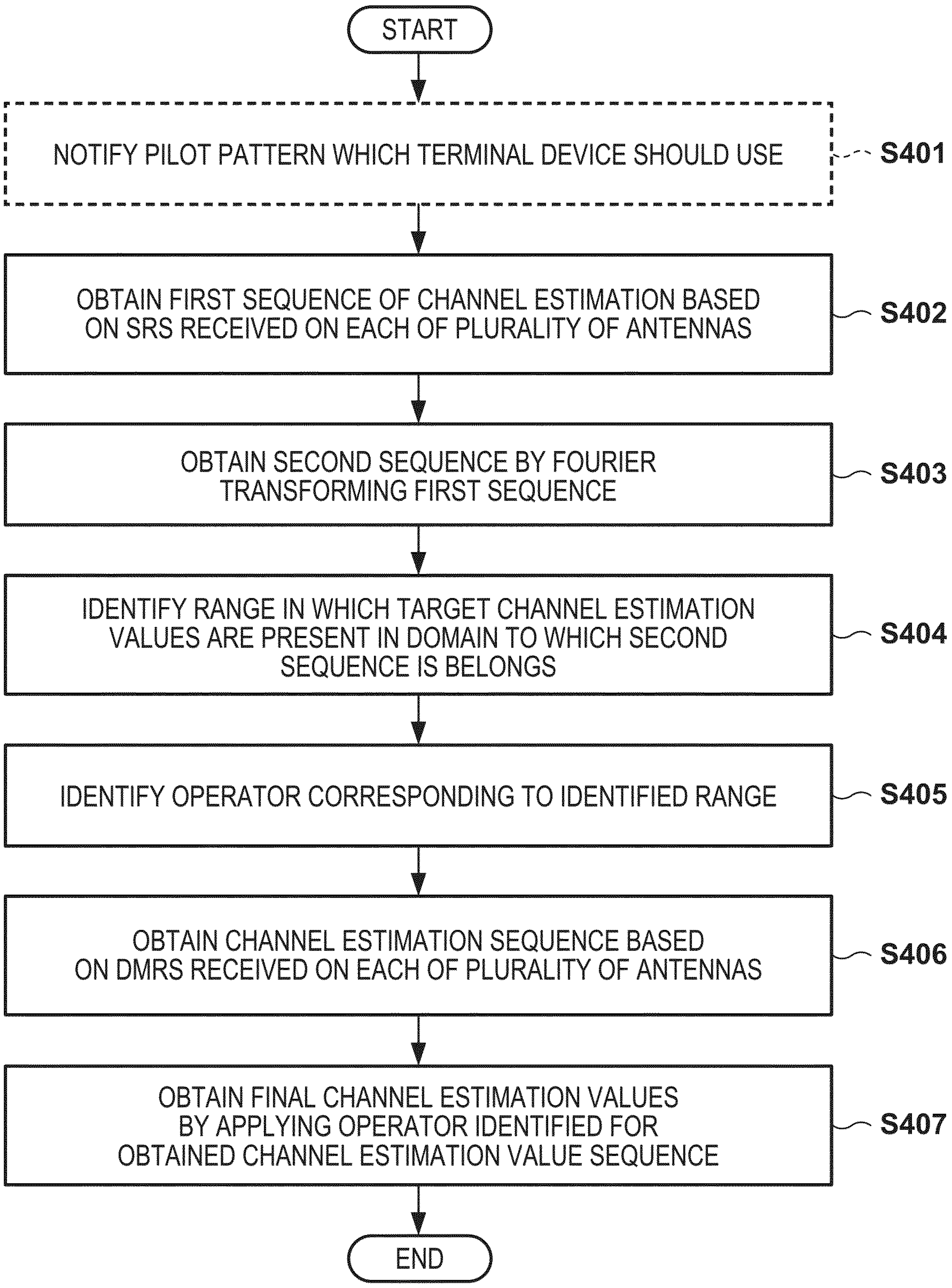
FIG. 4 is a diagram showing an example of a flow of processing executed by the control device.

Next, an example of a flow of processing executed by the control device 101 in the present embodiment will be outlined with reference to FIG. 4. Since the contents of the processing are as described above, the flow of the processing is outlined here, and descriptions of the details are not repeated.

First, the control device 101 notifies a terminal device that is located at a position associated with antennas that are controlled by the control device of a pilot pattern (S401). The notification of the pilot pattern is, for example, a notification of a configuration of the pilot to be used in a reference signal such as a SRS. If the SRS is transmitted based on the same sequence on every opportunity of transmitting the SRS, the terminal device may be notified of information regarding a pilot symbol to be used in a transmission opportunity. In this case, it is sufficient to give the notification of the pilot pattern in accordance with a conventional method, and accordingly, the control device 101 need not newly execute the processing in step S401. If the SRS is transmitted based on different sequences on different opportunities to transmit the SRS, the terminal device is notified of information that enables identification of a pilot symbol to be used in each of a plurality of transmission opportunities. The information may be, for example, information such as an argument for calculating the pilot symbol to be used from a time index (for example, a frame number) of a transmission opportunity of the SRS. For example, the terminal device may be notified of an index specifying a pilot symbol to be used in the first transmission of the SRS and an offset value for determining a pilot symbol to be used in the subsequent opportunities to transmit the SRS. The terminal device adds the offset value to the first index to identify an index of a pilot symbol to be used in the second transmission of the SRS, and adds the offset value to the second index to identify an index of a pilot symbol to be used in the third transmission of the SRS. In this case, the indexes can be identified by performing a modulo operation using the maximum value of the indexes as a modulus. Note that this is an example, and the terminal device may be notified of information in which indexes of pilot symbols to be used are respectively associated with a plurality of time indexes, for example.

Then, the control device 101 obtains tentative channel estimation values based on the SRS transmitted from the terminal device and received by the plurality of antennas (S402). The tentative channel estimation values are obtained by multiplying the signal received at each antenna by the complex conjugate value of the transmitted pilot symbol. Note that the channel estimation values obtained at this time include the influence of a SRS transmitted from another terminal device with use of the same pilot symbol. The tentative channel estimation values are arranged in a predetermined order based on indexes of the plurality of antennas, for example, to generate a first sequence that includes the channel estimation values corresponding to the respective antennas as elements.

The control device 101 performs Fourier transform on the first sequence to generate a second sequence of a different domain (S403). Then, the control device 101 identifies a range in which target channel estimation values (for example, between the terminal device notified of the pilot pattern in step S401 and each antenna) are present in the domain (second domain) to which the second sequence belongs (S404). For example, the control device 101 extracts target components from the second sequence through statistical processing and identifies a range in which those components are mainly present. In order to remove the influence of noise or the like, it is possible to identify a range in which elements having an amplitude of at least a predetermined value are present in the extracted sequence of target components, as the range in which the target components are present. Then, the control device 101 identifies an operator for extracting only elements within the identified range from a sequence of channel estimation values (S405). For example, the control device 101 may calculate a submatrix by extracting only elements corresponding to the identified range from a matrix indicating the Fourier transform, and identify, as the operator, a matrix product obtained by multiplying a conjugate transpose matrix of the submatrix by the submatrix.

Then, the control device 101 obtains a sequence of tentative channel estimation values based on a DMRS received via the plurality of antennas associated with the terminal device, for example (S406). This processing is the same as the processing performed in step S402 except that the received signal is changed from a SRS to a DMRS. Note that this is an example, and the processing in step S402 may be performed using a DMRS, or the processing in step S406 may be performed based on a reference signal other than a DMRS, for example. Also, a reference signal different from a SRS and a DMRS (for example, a newly defined reference signal) may be used in steps S402 and S406. The control device 101 then applies the operator identified in step S405 to the sequence obtained in step S406 to obtain final channel estimation values (S407).

As described above, in the present embodiment, the control device 101 initially obtains first channel estimation values based on a predetermined reference signal such as a SRS received via a plurality of antennas associated with a terminal device. Based on the first channel estimation values, the control device 101 identifies a range in which channel estimation values corresponding to the terminal device are distributed in a domain after the sequence of channel estimation values are subjected to Fourier transform. Thereafter, the control device 101 identifies an operator for extracting only components corresponding to the identified range in the domain after the Fourier transform, and applies the operator to channel estimation values identified with use of a reference signal such as a DMRS used in communication to obtain final channel estimation values. With this configuration, it is possible to increase the accuracy of channel estimation values identified based on a DMRS for communication with a terminal device by eliminating the influence of interference signals from other terminal devices that transmit the same DMRS but does not transmit at least some SRSs transmitted by the terminal device, for example. This enables the improvement of communication efficiency and thus contributes to Goal 9 of the UN Sustainable Development Goals (SDGs), "build resilient infrastructure, promote sustainable industrialization, and foster innovation."

The present invention can improve the accuracy of channel estimation in a wireless communication system in which a communication service is provided to a terminal device by selectively using a large number of antennas.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device comprising:

one or more processors; and one or more memories that store a computer-readable instruction for causing, when executed by the one or more processors, the control device to:

obtain a first sequence by arranging a plurality of first channel estimation values in a predetermined order, the first channel estimation values being obtained by receiving a signal including a first signal transmitted from a terminal device at each of a plurality of antennas;

convert the first sequence of a first domain to a second sequence of a second domain by performing Fourier transform on the first sequence;

identify a range in which a signal transmitted from the terminal device is received in the second domain, based on the second sequence;

obtain third channel estimation values by extracting components within the range in the second domain from second channel estimation values obtained by receiving a second signal transmitted from the terminal device at each of the plurality of antennas; and perform control such that communication with the terminal device is performed with use of the third channel estimation values.

2. The control device according to claim 1, wherein the first signal is a sounding reference signal (SRS).

3. The control device according to claim 2, wherein the first signal is transmitted with use of any of a plurality of pilot patterns obtained by varying a pilot symbol that is used in the SRS for each time, and the control device obtains the first sequence with use of a pilot pattern used to transmit the first signal.

4. The control device according to claim 1, wherein the control device obtains the first sequence in a plurality of time periods, and the control device identifies the range by executing principal component analysis or independent component analysis using a plurality of the second sequences respectively corresponding to the plurality of time periods.

5. A control method executed by a control device, the method comprising:

obtaining a first sequence by arranging a plurality of first channel estimation values in a predetermined order, the first channel estimation values being obtained by receiving a first signal transmitted from a terminal device at each of a plurality of antennas;

converting the first sequence of a first domain to a second sequence of a second domain by performing Fourier transform on the first sequence;

identifying a range in which a signal transmitted from the terminal device is received in the second domain, based on the second sequence;

obtaining third channel estimation values by extracting components within the range in the second domain from second channel estimation values obtained by receiving a second signal transmitted from the terminal device at each of the plurality of antennas; and performing control such that communication with the terminal device is performed with use of the third channel estimation values.

6. A non-transitory computer-readable storage medium that stores a program for causing a computer included in a control device to:

obtain a first sequence by arranging a plurality of first channel estimation values in a predetermined order, the first channel estimation values being obtained by receiving a first signal transmitted from a terminal device at each of a plurality of antennas;

convert the first sequence of a first domain to a second sequence of a second domain by performing Fourier transform on the first sequence;

identify a range in which a signal transmitted from the terminal device is received in the second domain, based on the second sequence;

obtain third channel estimation values by extracting components within the range in the second domain from second channel estimation values obtained by receiving a second signal transmitted from the terminal device at each of the plurality of antennas; and perform control such that communication with the terminal device is performed with use of the third channel estimation values.

* * * * *